United States Patent
Baumann

(10) Patent No.: US 8,869,832 B2
(45) Date of Patent: Oct. 28, 2014

(54) VARIABLE RESISTANCE DEVICE

(76) Inventor: Hans D Baumann, W. Palm Beach, FL (US)

(*) Notice: Subject to any disclaimer, the term of this patent is extended or adjusted under 35 U.S.C. 154(b) by 482 days.

(21) Appl. No.: 13/385,901

(22) Filed: Mar. 14, 2012

(65) Prior Publication Data
US 2013/0240059 A1 Sep. 19, 2013

(51) Int. Cl.
| F16K 47/08 | (2006.01) |
| F16K 47/00 | (2006.01) |
| F16L 55/02 | (2006.01) |
| G05D 7/01 | (2006.01) |

(52) U.S. Cl.
USPC .......................... 137/625.33; 251/118; 138/45

(58) Field of Classification Search
USPC ........... 137/625.33, 625.28; 251/118; 138/40, 138/44, 45, 46
See application file for complete search history.

(56) References Cited

U.S. PATENT DOCUMENTS

| 2,866,343 | A | * | 12/1958 | Kovacs | 74/54 |
| 3,060,957 | A | * | 10/1962 | Richards | 137/219 |
| 4,552,177 | A | * | 11/1985 | Lapeyre | 137/625.28 |
| 5,305,987 | A | * | 4/1994 | Baumann | 251/298 |
| 6,067,799 | A | * | 5/2000 | Heinitz et al. | 60/602 |
| 2008/0173363 | A1 | * | 7/2008 | Betting | 137/625.28 |

* cited by examiner

Primary Examiner — John Fox
Assistant Examiner — Michael R Reid

(57) ABSTRACT

A variable resistance device, suitable for pressure reduction in fluid control systems, comprising a housing with a pair of perforated tubes motivated to slide against each other in order to vary the amount of flow area exposed in such perforations, and wherein a cam and lever system causes sliding motion of one of the tubes.

10 Claims, 1 Drawing Sheet

VARIABLE RESISTANCE DEVICE

INTRODUCTION AND BACKGROUND OF THE INVENTION

The invention describes a device used to reduce fluid pressure in piping systems found in typical process plants. Pressure reduction of gases or liquids can reach from a few atmospheres to several hundreds. The undesirable by-product, of what is basically a change from potential energy to kinetic energy and finally to heat, is cavitation for liquids and high aerodynamic noise for gases. While cavitation can be very destructive for metals touched by the fluids, it also produces highly annoying sound.

Current efforts to combat such undesirable effects involve drilled cages installed in globe style valves which, while reasonably effective, they are rather small and their fluid impedance stays relatively constant with travel of the valve.

Other attempts are made to place multi-hole resistance plates downstream of a throttling valve. Their use is limited to fairly constant flow rates. For example, if the pressure drop across the valve is 16% of the total head loss at 100% of the flow rate, and that of the plate being 84%; then when the flow is cut in half, the pressure drop across is reduced to 0.5 squared×84=21%. Subsequently, the drop across the valve is now a very high 79%.

Sliding gate valves are reasonably effective in reducing noise and cavitation for moderate pressure reduction. The problem with this type of valve is, they exhibit very high friction forces due to the fact that one of the sliding plates is forced by the fluid pressure against a static second plate.

The current invention overcomes such friction forces, since instead of flat plates, the multi-passages sliding elements are a pair of concentric tubes. There is basically no friction, since the pressure acts on each portion of the inside circumference and thereby cancels out.

In contrast to other devices having constant area flow passages, this invention can vary the exposure of each flow passage in form of a variation in the overlap of two circular holes with change in the placement of one of the tubes. This not only increases the fluid impedance at reduced flow rates, but also results in higher frequency of sound with throttling of gases. Higher frequencies are better absorbed by a pipe wall, hence there is less audible sound exterior of the pipe.

Finally, a highly desirable flow characteristic is achieved by the system of overlapping circular holes, since the area exposed by the overlap varies roughly to the square of the distance between the center of the two holes.

These and more of the advantages and features of the invention will become more clear in view of the following detailed description.

DETAILED DESCRIPTION

Figure 1:
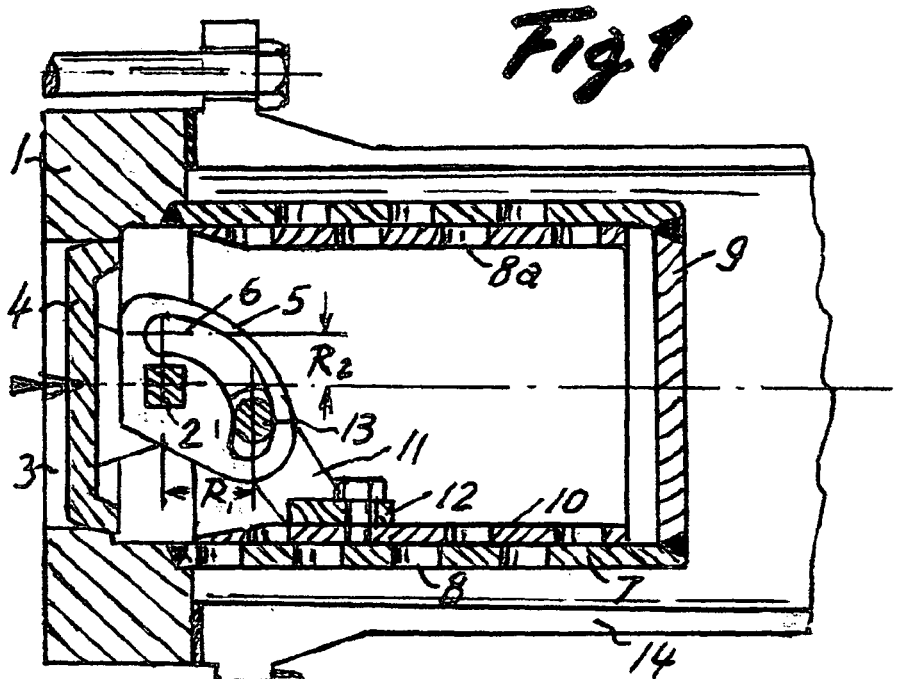
FIG. 1 is a central, cross-sectional view of a preferred embodiment of my invention as part of a butterfly valve, where both the valve and additional flow passages are closed.

Referring to FIG. 1, the invention is shown in a preferred embodiment, comprising a housing 1, having a rotatable shaft 2. Said housing furthermore has an inlet port 3 to admit fluids. Said port engages a butterfly vane 4 mounted and motivated by shaft 2 and shown here in the closed position. Shaft 2, in addition, engages a cam 5 having a curved opening 6.

Housing 1 connects to a first tube 7, having equally spaced, circular, flow passages 8. A plate 9 provides closure of the first tube. A second tube 10 slidingly engages the inside of the first tube 7 and featuring flow passages 8a, identical to passages in the first tube.

A lever 11, whose base 12 is securely fastened to the inside diameter of the second tube 10, connects via pin 13 to the curved opening 6 of cam 5.

Housing 1 together with the two tubes engages a pipe 14, not part of the invention, and is secured by a flange 15. The inside diameter of the pipe 14 is sufficiently large, about 10% to 20% larger than the outside diameter of the first tube, in order to pass all the fluid passing said butterfly vane 4, entering the inside of the second tube 10, and from there through passages 8a into passages 8, and finally discharging into pipe 14.

The current view shows both the butterfly vane 4 and all flow passages 8 and 8a being closed.

Figure 2:
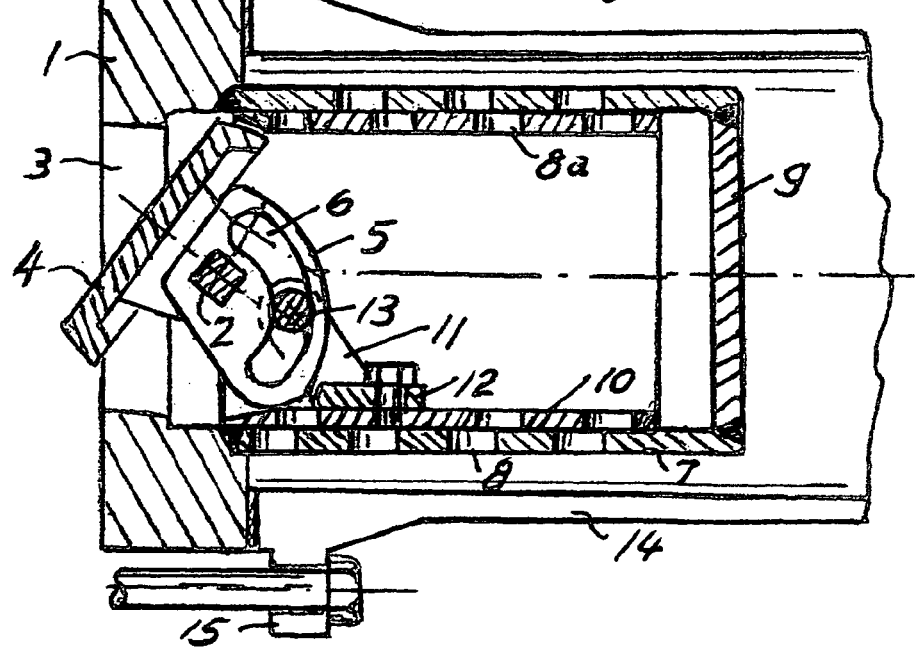
FIG. 2, shows a similar view, wherein both the butterfly valve and the additional flow passages are in the partly open position.

FIG. 2, in contrast, shows the butterfly vane 4 in a partially open position, following a rotation of shaft 2. Such rotation causes the cam 5 to turn, whereby the curved slot 6 forces pin 13 and with it lever 11 to slide the inner tube towards the housing 1. This causes a partial overlap of the openings of passages 8 and 8a to enable fluids to pass. This allows fluids, after passing through inlet port 3, and being throttled by vane 4, to enter passages 8a to be again throttled by the restricted areas of said pages. The fluid is then allowed to pass into pipe 14.

It should be noted, that the size and shape of passages 8 and 8a can be selected to provide a desired flow characteristic, i.e. a ratio between the of the combined impedance of both the vane and the passages, and the distance of the tube travel.

The preferred type of flow passages are circular holes, having the advantage that the exposed area between two overlapping holes varies geometrically with the overlapping distance.

The distance between two sets of holes is equal to the size of the hole plus a 10% to 15% overlap, in order to insure closure. The total movement of the second tube to go from fully closed passages (see FIG. 1) to fully open is equivalent to the distance R1–R2 (shown in FIG. 1).

Having shown the invention in a preferred embodiment should not prevent certain modifications without departing from the scope of the enclosed claims. For example, my invention may well be used without an attached butterfly valve, or with, or without, any other valve type. Furthermore, identical results can be achieved using a reciprocating shaft, having a suitable cam mounted thereon, instead of using a rotating shaft.

The invention claimed is:

1. A variable fluid resistance device comprising a housing having a movable shaft, a first tube fastened to said housing and slidingly engaging therein a second tube having an external diameter close to the internal diameter of said first tube, and wherein said first and second tube have a number of fluid conducting passages, means to compel sliding motion to said second tube following a movement of said shaft.

2. A variable fluid resistance device as in claim 1, wherein the fluid conducting passages in both tubes are identical and are equally spaced in regards to each other.

3. A variable fluid resistance device as in claim 2, wherein the longitudinal distance between individual passages is larger than the size of the passage itself, so that when the second tube is at a given end position, the longitudinal wall distance between its passages will overlap the passage of the first tube and thus prevent fluid from passing.

4. A variable fluid resistance device as in claim 2, wherein said passages are circular.

5. A variable fluid resistance device as in claim 1, wherein the terminating end of the first tube, being opposed to said housing, is enclosed in order to prevent the escape of fluid.

6. A variable fluid resistance device as in claim 1, wherein said means to compel motion comprises a lever being attached to said second tube, said lever being connected to a cam being fastened to the shaft, and where said cam is able to motivate the lever and thereby impose sliding motion on the second tube.

7. A variable fluid resistance device as in claim 1, wherein said shaft is able to rotate.

8. A variable fluid resistance device as in claim 1, wherein said housing has a fluid inlet port extending to the opening of the second tube.

9. A variable fluid resistance device as in claim 1, wherein said housing is capable to be connected to a flanged pipe whose interior diameter is at least fifteen percent larger than the outside diameter of the first tube.

10. A variable fluid resistance device as in claim 1, wherein said housing incorporates a butterfly valve.

\* \* \* \* \*